United States Patent
Hostyn et al.

(10) Patent No.: US 10,084,601 B2
(45) Date of Patent: Sep. 25, 2018

(54) METHOD, SYSTEM AND ELECTRONIC DEVICE

(71) Applicants: Sony Corporation, Tokyo (JP); Sony Europe Limited, Weybridge (GB)

(72) Inventors: Tom Hostyn, Halle (BE); Jan Spooren, Schoten (BE); Hugo Embrechts, Bierbeek (BE); Conor Aylward, Brussels (BE)

(73) Assignee: Sony Corporation, Tokyo (JP)

( * ) Notice: Subject to any disclaimer, the term of this patent is extended or adjusted under 35 U.S.C. 154(b) by 134 days.

(21) Appl. No.: 14/735,290

(22) Filed: Jun. 10, 2015

(65) Prior Publication Data

US 2015/0365235 A1 Dec. 17, 2015

(30) Foreign Application Priority Data

Jun. 17, 2014 (EP) .................................. 14172736

(51) Int. Cl.
*H04L 29/06* (2006.01)
*H04L 9/32* (2006.01)
*H04W 12/04* (2009.01)
*H04W 12/06* (2009.01)
*H04L 29/08* (2006.01)

(52) U.S. Cl.
CPC .......... *H04L 9/3215* (2013.01); *H04L 9/3228* (2013.01); *H04L 63/08* (2013.01); *H04L 63/18* (2013.01); *H04W 12/04* (2013.01); *H04L 63/0838* (2013.01); *H04L 63/0853* (2013.01); *H04L 67/02* (2013.01); *H04L 2463/082* (2013.01); *H04W 12/06* (2013.01)

(58) Field of Classification Search
CPC .............. H04L 2209/608; H04L 63/08; H04L 63/0853; H04L 2463/082; H04L 9/0877; H04L 9/3228; G06F 21/34; G06F 21/36
See application file for complete search history.

(56) References Cited

U.S. PATENT DOCUMENTS

| 8,540,149 B1 | 9/2013 | Chu | |
|---|---|---|---|
| 8,646,060 B1 | 2/2014 | Ben Ayed | |
| 2003/0093539 A1* | 5/2003 | Simeloff | G06F 21/31 709/229 |
| 2006/0230265 A1* | 10/2006 | Krishna | H04L 63/0281 713/158 |

(Continued)

FOREIGN PATENT DOCUMENTS

JP 2006-126990 A 5/2006

OTHER PUBLICATIONS

Kalker, "A Video Watermarking System for Broadcast Monitoring", pp. 1-10, pub date: 1999.*

(Continued)

*Primary Examiner* — Jason K Gee
(74) *Attorney, Agent, or Firm* — Xsensus, LLP

(57) ABSTRACT

A method comprising generating an auxiliary key based on a secret key which is stored in an electronic device, generating a representation of the auxiliary key, displaying the representation of the auxiliary key on a display of the first electronic device, capturing the representation of the auxiliary key with a camera of a second electronic device, and restoring the auxiliary key from the captured representation of the auxiliary key.

15 Claims, 5 Drawing Sheets

(56) References Cited

U.S. PATENT DOCUMENTS

| | | | |
|---|---|---|---|
| 2007/0130472 A1* | 6/2007 | Buer | H04L 63/0428 713/182 |
| 2008/0198421 A1* | 8/2008 | Hirahara | H04N 1/00244 358/403 |
| 2008/0267517 A1* | 10/2008 | Hamada | H04N 1/32149 382/238 |
| 2009/0313687 A1* | 12/2009 | Popp | H04L 9/3228 726/9 |
| 2010/0122320 A1* | 5/2010 | Merati | H04L 9/006 726/3 |
| 2010/0321739 A1* | 12/2010 | Amagai | G06T 3/00 358/3.28 |
| 2012/0017081 A1* | 1/2012 | Courtney | G06K 7/10722 713/156 |
| 2012/0272279 A1* | 10/2012 | Lim | H04N 21/23892 725/109 |
| 2013/0268881 A1* | 10/2013 | Bartkiewicz | G06F 3/0484 715/780 |
| 2013/0308817 A1 | 11/2013 | Konkel et al. | |
| 2014/0040991 A1* | 2/2014 | Potonniee | H04L 63/08 726/4 |
| 2014/0062874 A1* | 3/2014 | Suggs | G06F 3/0325 345/158 |
| 2014/0067678 A1* | 3/2014 | Lee | G06Q 20/02 705/44 |
| 2014/0158760 A1* | 6/2014 | Seker | G06F 17/30943 235/380 |
| 2015/0074230 A1* | 3/2015 | Lee | G06F 3/04817 709/219 |
| 2015/0121488 A1* | 4/2015 | Vaughn | H04L 63/08 726/6 |
| 2015/0178721 A1* | 6/2015 | Pandiarajan | G06Q 20/382 705/75 |
| 2015/0260474 A1* | 9/2015 | Rublowsky | F41A 33/00 434/16 |
| 2015/0326394 A1* | 11/2015 | Ohayon | G06Q 20/3278 713/176 |
| 2015/0348015 A1* | 12/2015 | Ren | G06Q 20/3226 705/41 |
| 2015/0350894 A1* | 12/2015 | Brand | H04L 63/0435 380/270 |

OTHER PUBLICATIONS

Angus Kidman, "How the Samsung Gear Smart Watch Solves a Major Security Problem" Lifehacker—http://www.lifehacker.com.au/2013/09/how-the-samsung-gear-smart-watch-solves-a-major-security-problem/, Sep. 5, 2013, 3 Pages.

Jeffrey Schiller, et al., "Randomness Requirements for Security" The Internet Society, Jun. 2005, pp. 1-48.

D. M'Raihi, et al., "HOTP: An HMAC-Based One-Time Password Algorithm" IETF: http://ietf.org/rfc/rfc4226.txt, Dec. 2005, pp. 1-33.

"Information technology—Automatic identification and data capture techniques—QR Code 2005 bar code symbology specification" International Standard—ISO/IEC 18004, Sep. 1, 2006, 124 Pages.

A. Al-Gindy, et al., "A New Watermarking Scheme for Colour Images Captured by Mobile Phone Cameras" International Journal of Computer Science and Network Security, vol. 9, No. 7, Jul. 2009, pp. 248-253.

Wenjun Zeng, et al., "A Statistical Watermark Detection Technique without Using Original Images for Resolving Rightful Ownerships of Digital Images" IEEE Transactions on Image Processing, vol. 8, No. 11, Nov. 2011, pp. 1-36.

"Time-based One-time Password Algorithm" Wikipedia—https://en.wikipedia.org/wiki/Time-Based_One-time_Password_Algorithm, May 22, 2015, pp. 1-5.

D. M'Raihi, et al., "TOTP: Time-Based One-Time Password Algorithm" IETF—http://tools.ietf.org/html/rfc6238, May 2011, pp. 1-16.

Matt Cutts, "Please Turn on Two-Factor Authentication" Lifehacker—http://lifehacker.com/5932700/please-turn-on-two-factor-authentication, Aug. 8, 2012, pp. 1-9.

"LastPass—User Manual" LastPass—https://helpdesk.lastpass.com/multifactor-authentication-options/google-authenticator/, 2015, pp. 1-5.

"AWS Multi-Factor Authentication" Qiita—http://qiita.com/funami/items/d510a20c408c4ac112d3, Jan. 13, 2014, pp. 1-8.

Ron Amadeo, "Google buys SlickLogin, a startup out to kill the password with sound" Arstechnica—http://arstechnica.com/gadgets/2014/02/google-buys-slicklogin-a-startup-out-to-kill-the-password-with-sound/, Feb. 17, 2014, pp. 1-3.

"Google Authenticator" Wikipedia—https://en.wikipedia.org/wiki/Google_Authenticator, May 21, 2015, pp. 1-3.

* cited by examiner

201
-----BEGIN SECRET KEY-----
4AAC8307B3B8FADF87D8A0758597A3EEA79E9E4168112A07FF44B7F4E
FA1B32A
-----END SECRET KEY-----

METHOD, SYSTEM AND ELECTRONIC DEVICE

The present disclosure generally pertains to methods, systems and electronic devices which are used in password authentication scenarios, for example methods, systems and electronic devices which can be used in second factor password authentication scenarios.

TECHNICAL BACKGROUND

Second factor password authentication (2FA) involves two stages to verify the identity of an entity trying to access services in a computer or in a network. Each stage typically involves a different authentication factor, for example a knowledge factor, a possession factor, or an inherence factor.

A primary authentication factor is typically based on "knowledge". The user remembers credentials such as a predefined user name, password, or a personal identification number (PIN) for authenticating at a service.

Many solutions for second authentication factors exist. For example a SMS message with a code may be sent to the user. The user reads this code from the display of a mobile phone and then types the code into a website for authentication purpose. This type of authentication can be attributed to the "possession factor" category. The user needs to be in possession of the mobile phone, or more precisely in possession of the SIM card, in order to be able to receive the SMS code. Other second factor authentication solutions comprise installing a software application on a mobile phone. The software application generates codes that the user needs to type into a website. Further, small electronic devices exist which generate codes that the user needs to type into a website.

Other solutions for second authentication factors rely on fingerprints, retinal patterns, or the like. Such solutions are typically attributed to the "inherence factor" category.

Second factor authentication solutions as those described above are used for example for authenticating transactions in electronic banking. Business uses of second factor authentication comprise access to virtual private networks (VPN). Further, many popular websites offer second factor authentication solutions to make the user verification safer.

Second factor authentication solutions which rely on possession and/or inherence factors are safer than a verification which is based on a knowledge factor (user name and password) alone. However, they require additional efforts from the user which may be felt as difficult and annoying.

SUMMARY

According to a first aspect the disclosure provides a method comprising generating an auxiliary key based on at least a secret key which is stored in a first electronic device, generating a representation of the auxiliary key, displaying the representation of the auxiliary key on a display of the first electronic device, capturing the representation of the auxiliary key with a camera of a second electronic device, and restoring the auxiliary key from the captured representation of the auxiliary key.

According to a further aspect the disclosure provides an electronic device comprising a processor which is configured to derive an auxiliary key from at least a secret key stored in the electronic device and to generate a representation of the auxiliary key, the representation of the auxiliary key being configured to be captured by a camera and decoded by a processor. The electronic device further comprises a display configured to display the representation of the auxiliary key.

According to a further aspect the disclosure provides an electronic device comprising a camera which is configured to capture a representation of an auxiliary key, the auxiliary key having been generated based on a secret key. The electronic device further comprises a processor configured to restore the auxiliary key from the captured representation of the auxiliary key and to use the restored auxiliary key for authenticating a user.

According to a further aspect the disclosure provides a system comprising an electronic device for generating an auxiliary key and an electronic device for capturing and restoring the auxiliary key.

BRIEF DESCRIPTION OF THE DRAWINGS

Embodiments are explained by way of example with respect to the accompanying drawings, in which.

DETAILED DESCRIPTION OF EMBODIMENTS

Figures 1, 2:
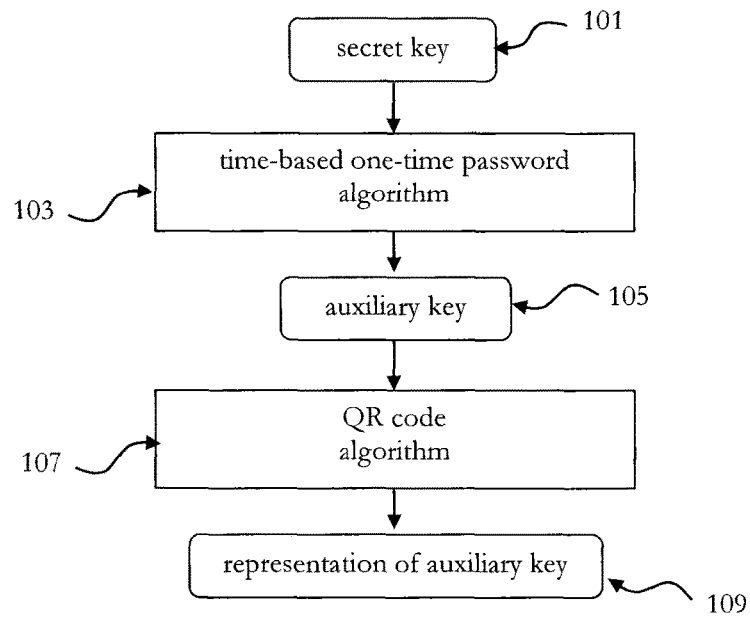
FIG. 1 schematically illustrates an embodiment in which a time-based one-time password algorithm is used to generate an auxiliary key.
FIG. 2 illustrates an example of a secret key.

Before a detailed description of the embodiments under reference of FIG. 1 is given, general explanations are made.

The methods, systems and electronic devices disclosed below may be used to verify the identity of an entity trying to access services in a computer or in a network. They can for example be used as part of a two factor authentication to verify the identity of a user who wants to access a service of a computer or network, such as a website or web service. Alternatively, the methods, systems and electronic devices may be used in business applications such as virtual private networks (VPN), in electronic banking, or the like.

An entity to be authenticated by the disclosed methods, systems and electronic devices may be a user, a group of users, or an electronic device.

A method for authenticating an entity may comprise generating an auxiliary key based on at least a secret key which is stored in a first electronic device, generating a representation of the auxiliary key, displaying the representation of the auxiliary key on a display of the first electronic device, capturing the representation of the auxiliary key with a camera of a second electronic device, and restoring the auxiliary key from the captured representation of the auxiliary key.

A secret key may be any piece of information that can be used to determine the functional output of a cryptographic algorithm or cipher. A secret key may for example be obtained by randomly producing a sequence of bits based on some arbitrary random factor such as a pseudo-random number generator.

In the embodiments disclosed below, to prevent the secret key from being guessed, a secret key is used which has been generated truly randomly and contains sufficient entropy. For example random mouse movements can be used to provide true randomness and high entropy. RFC 4086, "Randomness Requirements for Security" provides guidelines for generating secret keys with good characteristics. A secret key may for example be any random number, for example a random number with 80 digits, 128 digits, 256 digits, or 1024 digits, or more. The longer the secret key is, the less are the chances that it will be guessed. According to some embodiments, the secret key is a sequence of 128 bits (8 bytes) size. In other embodiments, the secret key may be a sequence of 192 bits (24 bytes) size, or of 256 bits (32 bytes) size.

In the embodiments described below the secret key is stored in the first electronic device. The secret key may for example be stored in a memory of the first electronic device. The memory may be a non-volatile computer storage such as a flash memory card, a hard disk, a solid state disk or the like.

The secret key may be generated in advance, e.g. when a user registers at a web service. The secret key may for example be randomly generated in the first electronic device. The secret key may then be exchanged with the authentication partner, for example with a web service. Advantageously, the secret key is exchanged with the authentication partner in a secure manner, for example using a secure network connection such as an SSL secured Internet connection. Alternatively, the secret key may be exchanged with the authentication partner by conventional mail or personally. Still alternatively, the secret key can be transferred over visual means, such as a QR code.

Generation of the secret key and exchange of the secret key is typically done only once within an initialisation process, such as when registering at a web service or when establishing a second factor authentication.

After establishing the secret key and after having exchanged the secret key, the secret key may be used to generate one or more auxiliary keys.

The auxiliary key generated based on the secret key may for example be a one-time password. A one-time password is valid for only one login session or transaction, or only for a limited period of time.

There exist many ways of generating an auxiliary key based on the secret key.

The auxiliary key may for example be generated based on the secret key and a variable value by using a cryptographic hash function.

The auxiliary key may for example be generated based on the secret key and a counter value to produce a one-time password.

An auxiliary key may be generated based on the secret key and a counter value according to a HMAC-based one-time password algorithm (HOTP) defined by the Initiative For Open Authentication (OATH) as informational IETF RFC 4226. The HMAC-based one-time password algorithm makes uses of the SHA-1 cryptographic hash function which is defined by a U.S. Federal Information Processing Standard published by the United States NIST. The generation of an auxiliary key may however be based on any alternative cryptographic function such as MD5, SHA-0, SHA-3 or the like.

The counter value used in the HMAC-based one-time password algorithm is used as a moving factor in generating the one-time password. The counter may be 8-byte counter value which is synchronized between the HOTP generator (first electronic device) and the HOTP validator (web service).

In a specific embodiment, the auxiliary key is generated based on the time-based one-time password algorithm (TOTP) according to Internet Engineering Task Force standard RFC 6238. According to TOTP, the counter value is derived from a time value so that the moving factor is a time based moving factor.

The auxiliary key generated according to the algorithms described above may be a digital value with a predefined number of digits.

A method for authenticating an entity as disclosed below further comprises generating a representation of the auxiliary key.

Generating the representation of the auxiliary key may comprise coding the auxiliary key according to a coding scheme.

Coding the auxiliary key may comprise generating at least one of a bar code, a matrix code, an image code, or a pictorial animation.

Any bar code or matrix code scheme can be used to produce a pictorial representation of the auxiliary key which can be decoded by a corresponding bar code or matrix code reader. A matrix code may for example be generated according to the coding scheme defined by the QR code standard ISO/IEC18004:2006, or according to Micro-QR-Code standard JIS X 0510.

Generating the representation of the auxiliary key may also comprise transferring the auxiliary key into a pictorial animation which is used as representation of the auxiliary key. For example the digits of an auxiliary key might be transferred to movements of a dancing character. A coding scheme is defined by recognising each dance move as a numeric code. Coding an auxiliary key according to such a coding scheme thus produces an individual dance which has a one-to-one correspondence to the respective auxiliary key from which it was produced. Such an auxiliary key can be decoded by a processor having knowledge about the respective coding scheme used to generate the auxiliary key.

The thus generated representation of the auxiliary key may then be displayed on a display of the first electronic device.

In an alternative embodiment, the representation of the auxiliary key is injected as a watermark into a display content. The watermark is injected in a way so that it is invisible to a user. Despite being invisible to the user watching the display, a processor and camera of an electronic device may still be capable of capturing the watermark and reconstructing an auxiliary key from the watermark. Thus, for example, while a user just sees a slideshow of his daughter, an invisible representation of an auxiliary key may be displayed on the display.

A watermarking technique which can be used to embed and extract an auxiliary code into a display content is described by A. Al-Gindy et al. in "A New Watermarking Scheme For Colour Images Captured By Mobile Phone Cameras", IJCSNS International Journal of Computer Science and Network Security, VOL. 9 No. 7, July 2009. This reference gives as example the embedding/extraction of a bit sequence of 64 bits into an image. The injected watermark can be extracted again without pre-knowledge of the watermark. The algorithm is robust against quality loss, for example caused by capturing the image by a camera on a second device. A watermark inserted as described by A. Al-Gindy et al can be considered as equivalent to a QR code. An algorithm can look at the picture with the embedded watermark, extract an auxiliary code from it, and send the auxiliary code to a server for validation.

As a further example, the watermarking technique described by W. Zeng in "A Statistical Watermark Detection Technique Without Using Original Images for Resolving Rightful Ownerships of Digital Images", IEEE Transactions on Image Processing, Vol. 8, No. 11, November 2011 can be applied. This statistical watermark detection technique allows for capturing the watermark without knowing the original (not watermarked) image. In an embodiment which uses the statistical method, the algorithm on the client is arranged to receive the picture, to contact the server to retrieve the expected watermark, do the statistical analysis, and send the result to the server. In a still alternative embodiment which uses the statistical method the client is arranged to retrieve the picture and to send it to the server for analysis.

In a still further embodiment a time-based one-time password which is derived from the current system time is coded as watermark (for example according to the watermarking techniques reference above) and permanently displayed on a display as an invisible watermark. This time-based one-time password will change with the advancing time. Accordingly the watermark injected into the displayed content will also change. The changing time-based one-time password can be displayed on the display of the first electronic device no matter what application or movie the first electronic device is actually presenting to a user. This means that a one-time password is permanently available without that the user has to start a specific software application. The user just has to show the first electronic device to the second electronic device without needing to start any application on the first electronic device.

The method may further comprise capturing the representation of the auxiliary key with a camera of a second electronic device. To this end, the second electronic device may be pointed at the display of the first electronic device which displays the auxiliary key. The second electronic device can capture a picture or movie of the representation of the auxiliary key.

The method may further comprise restoring the auxiliary key from the captured representation of the auxiliary key.

For example, the second electronic device may comprise a bar code or matrix code reading function which decodes the image of a bar code or matrix code into a corresponding digital representation of the auxiliary key represented by the image.

Alternatively or in addition, the second electronic device may comprise a function which analyses a pictorial animation, for example a movie of a dancing character, to decode the pictorial animation and regenerate a digital representation of the auxiliary key that was used in producing the pictorial animation. These functions may for example be implemented by software algorithms.

Still alternatively or in addition, the second electronic device may comprise a processor which is configured to perform a watermarking technique, for example such as described by A. Al-Gindy et al. referenced above, or such as the statistical watermark detection technique described in the article of W. Zeng referenced above.

The restoring the auxiliary key must not necessarily be performed by the processor of the second electronic device. Alternatively, the restoring the auxiliary key may also be performed by a network service. To this end, the second electronic device transmits the captured representation of the auxiliary key to the network service, for example via a network connection. The network service processes the captured representation of the auxiliary key to restore the auxiliary key, and then transmits the restored auxiliary key back to second electronic device.

The restored auxiliary key can then be used for authenticating an entity at, for example, a service of a computer or network.

The authentication partner, e.g. a web service, can validate whether or not the auxiliary key was generated based on the secret key which was previously exchanged. If the verification confirms to the positive that the auxiliary key was generated based on the secret, then the web service can conclude that the authenticating entity is in possession of the secret key and thus can grant access. Otherwise the web service will deny access.

In the case that the secret key is stored in a first electronic device, any person which possesses the first electronic device is enabled to pass this verification which relies on possession of the secret key.

In some embodiments the restored auxiliary key is used as a second factor authentication password. For example, a user may first authenticate at a web service based on knowledge factors such as username and password. The user may then use an auxiliary key in a second factor verification.

Alternatively, an authentication process may also rely on the auxiliary key alone.

In a still further example, the above described methods can be used in a challenge-response type authentication, for example in a digest authentication, to provide a sophisticated authentication process. In this example, both, the first electronic device and the second electronic device each comprise a display and a camera. The first electronic device may for example be a gaming station and the second electronic device may for example be a mobile phone. The first electronic device, according to the principles described above, generates an auxiliary key (the challenge) based on a shared secret key, generates a representation of the auxiliary key (e.g. a QR code or pictorial animation), and displays the representation of the auxiliary key on its display. The camera on the second captures the representation of the auxiliary key and restores the auxiliary key from the representation of the auxiliary key. Based on the shared secret key, the second electronic device calculates a suitable response to the challenge. The response may for example be calculated according to any prerequisites of a predefined challenge-response type authentication process or digest authentication processes. The second electronic device then generates a representation of the response (e.g. a QR code or pictorial animation) according to the same principles as the first electronic device, and then displays the representation of the response on its display. The first electronic device uses a camera to capture the representation of the response and then processes the representation of the response to restore the response. The first electronic device can then validate the response. If the response is valid, the first electronic device may grant access to its services.

In the following it is described an electronic device which is used for producing an auxiliary key. This electronic device can be used as the first electronic device in the methods described above.

An electronic device, according to the embodiments, may comprise a processor which is configured to derive an auxiliary key from at least a secret key stored in the electronic device and to generate a representation of the auxiliary key, the representation of the auxiliary key being configured to be captured by a camera and decoded by a processor. The electronic device further comprises a display configured to display a representation of the auxiliary key.

The display may be any kind of electronic display such as a TFT display, a LCD display, an AMOLED display, a plasma display, or the like.

The electronic device may further comprise an input unit which enables a user of the electronic device to trigger the generating of the auxiliary key. The input unit may for example be a keyboard, a touch screen, a button, a voice command interface, or the like. Still alternatively, the generation of an auxiliary key may also be triggered over a network interface, e.g. by an Internet service.

In some embodiments the electronic device is a portable device such as a mobile phone, an audio player, a netbook, a tablet PC, or the like. In other embodiments the electronic device is a desktop PC, a gaming station, TV, or the like.

The electronic device may be a wearable electronic device. For example, the electronic may be a smart watch.

In the following it is described an electronic device which is used for capturing an auxiliary key and using the captured auxiliary key for authenticating at a service of a computer or network. This electronic device can be used as the second electronic device in the methods described above.

An electronic device, according to the embodiments, may comprise a camera configured to capture a representation of an auxiliary key, the auxiliary key having been generated based on a secret key, and a processor configured to restore the auxiliary key from the captured representation of the auxiliary key.

The processor may further be configured to use the restored auxiliary key for authenticating a user.

The camera may be a camera which is integrated in the electronic device. Alternatively, the camera may be a peripheral device that is connected to the electronic device.

Restoring the auxiliary key from the captured representation of the auxiliary key may be based on a decoding algorithm. A matrix code such as a QR code can for example be decoded according to the respective coding rules stated in the QR coding standard. If the representation of the auxiliary key is a pictorial animation such as a movie of a dancing character as described above, then the captured pictorial animation is analysed and split into its parts, here the dance moves. Each part of the animation, here each dance move, is then recognised as a numeric code in order to decode the pictorial animation.

The processor may be arranged to determine whether a watermark has been injected into an image or video. If, for example, the processor detects that the expected watermark has been injected, the processor can restore the auxiliary key by applying a watermark detection technique in order to confirm the auxiliary key from the representation of the auxiliary key.

The restored auxiliary key may be used as a second factor authentication password as described with regard to the methods described above.

The restored auxiliary key may for example be used to authenticate a user at the second electronic device, or at a service of a computer or network such as a web site or web service which is accessible via the second electronic device.

The electronic device may be a portable device such as a camera-equipped mobile phone, audio player, netbook, tablet PC, or the like. In other embodiments the electronic device is a camera-equipped desktop PC, a gaming station, or the like.

The electronic device may also be an optical head-mounted display, or a camera device at a door allowing for physical access. The electronic device may also be configured in the form of wearable glasses.

For example, a user wearing an optical head-mounted display may generate an auxiliary key on a smart watch. The smart watch displays a matrix code which represents the auxiliary key. The user wearing the optical head-mounted display can look at the smart watch. The optical head-mounted display can automatically detect the matrix code, restore the auxiliary key from the matrix code and use the auxiliary key for authentication at a web service.

A system for authenticating an entity may comprise the above described first electronic device and the above described second electronic device. The first electronic device and the second electronic device may be used by an entity to authenticate at a service of a computer or network.

Embodiments are now described with reference to the drawings.

FIG. 1 schematically illustrates an embodiment in which a time-based one-time password algorithm is used to generate an auxiliary key. Time-based one-time password algorithm 103 generates auxiliary key 105 based on a secret key 101 stored in an electronic device. The secret key, according to this embodiment, is a predefined sequence of pseudo-random digits. A coding algorithm, here QR code algorithm 107, is used to generate a representation 109 of auxiliary key 105. According to this embodiment the representation 109 of the auxiliary key thus is a QR code.

The secret key may be any number sequence.

FIG. 2 illustrates an example of a secret key. The secret key 201 of this embodiment is a 256 bit pseudo-randomly generated number. The secret key 201 is represented by 64 hexadecimal characters, where each of the 64 hexadecimal characters encodes 4 bits of binary data, so the entire 64 characters is equivalent to 256 binary bits. The secret key 201 is stored in an electronic device and is used together with a counter value to generate an auxiliary key according to a time-based one-time password algorithm as described in more detail below with reference to FIG. 3. This can be seen as "signing" the counter value with secret key 201.

Secret key 201 is shared between the authentication partners (e.g. between a user and a web service). That is, the shared secret key 201 is used by the user for producing the auxiliary key, and the shared secret key 201 is used by the authentication partner to verify whether or not an auxiliary key received from the user has been produced based on this secret key 201.

Even though a specific secret key is shown in this embodiment, other types of secret keys may likewise be used. The embodiments described below do not rely on any specific key generation mechanism. The secret key may be any arbitrary cryptographic key, e.g. a random bit sequence of a given length.

Figure 3:
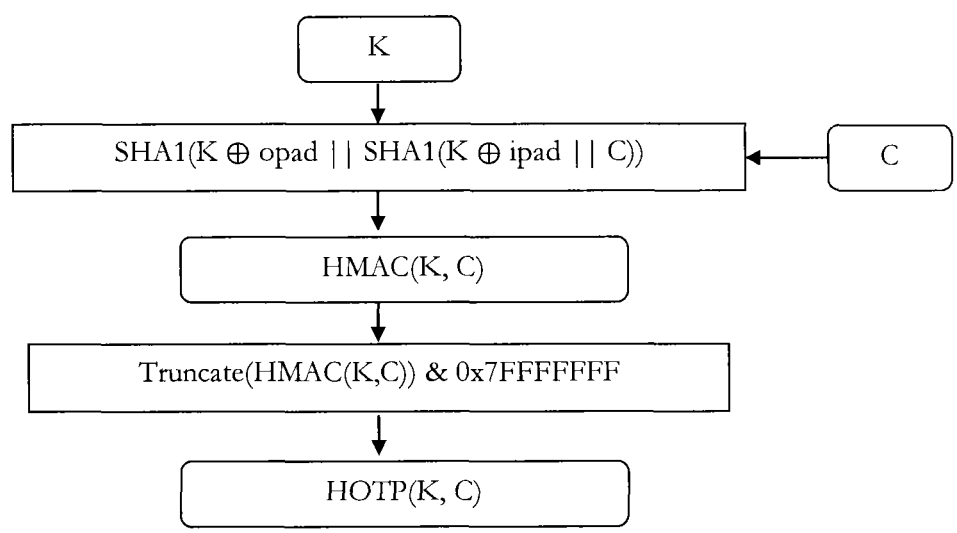
FIG. 3 schematically illustrates a time-based one-time password algorithm in more detail.

FIG. 3 schematically illustrates an embodiment in which a time-based one-time password algorithm is used to generate an auxiliary key.

A hash-based message authentication code HMAC(K,C) is generated based on a secret key K and based on a counter value C using a cryptographic hash function according to:

$$HMAC(K,C) = SHA1(K \oplus opad \| SHA1(K \| ipad \| C))$$

Here, SHA1 is a cryptographic hash function,
K is a secret key,
C is the message to be authenticated (here the counter value),
$\|$ denotes concatenation,
$\oplus$ denotes exclusive or (XOR), opad is an outer padding, for example hexadecimal constant 0x5c5c5c . . . 5c5c, and ipad is an inner padding, for example hexadecimal constant 0x363636 . . . 3636.

The length of the hexadecimal constants opad and ipad is adapted to the length of secret key K.

In alternative embodiments the cryptographic hash function SHA1 may be replaced by any other cryptographic hast function such as MD5, SHA0, etc.

A time-based one-time password HOTP(K,C) is then generated from the hash-based message authentication code HMAC(K,C) according to:

$$HOTP(K,C)=\text{Truncate}(HMAC(K,C))\&0x7FFFFFFF$$

Here, Truncate is a function that selects 4 bytes from the result of the HMAC in a defined manner. The mask 0x7FFFFFFF is chosen to disregard the most significant bit to provide better interoperability between processors.

HOTP(K,C) can be used as auxiliary key, for example in second factor authentication. If necessary, the length of HOTP(K,C) can be configured to a predefined length according to:

$$\text{auxiliary value}=HOTP(K,C)\bmod 10\textasciicircum d,$$

where d is the desired number of digits and ˆ denotes exponentiation.

Counter value C, according to the time-based one-time password algorithm, is chosen as an integer that represents the number of time steps of length X between an initial counter time T0 and the current system time T.

More specifically, $$C=\text{floor}((T-T0)/X),$$

where X is a defined time step length, T is the current system time, T0 is a predefined initial time, and floor is the floor function which is used in the computation to produce an integer number from a floating point number. For example, with T0=0 and time step X=30, then C=1 if the current system time is 59 seconds, and C=2 if the current system time is 60 seconds.

Figure 4:
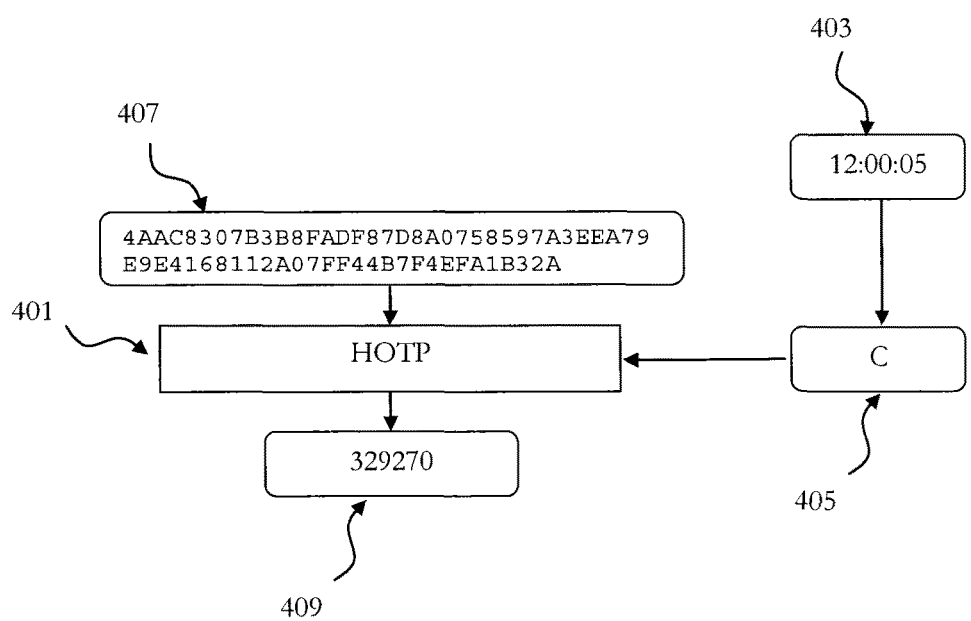
FIG. 4 schematically illustrates a further example in which a time-based one-time password algorithm is used to generate an auxiliary key.

FIG. 4 schematically illustrates a further example in which a time-based one-time password algorithm is used to generate an auxiliary key.

In this embodiment, the current system time 403 (12:00:05) is used to generate an auxiliary key 409 which is used as one-time password. Here the current system time 403 is given in the format hh:mm:ss, where hh denotes hours, mm denotes minutes and ss denotes seconds. The current system time 403 is converted to a counter value 405 according to the principles described above.

The secret key 407 used to sign the counter value 405 according to this embodiment is the 256 bit key which has already been described with regard to FIG. 2 above. This key, represented by hexadecimal numbers, is:

4AAC8307B3B8FADF87D8A0758597A3EE A79E9E4168112A07FF44B7F4EFA1B32A

The auxiliary key 409 thus generated, represented in numeric numbers, is 329270. It should be noted that, here, this number is given for illustrative purpose only. The precise number may vary with the specific cryptographic hash function used, with the specific paddings used and with the specific time step length used.

Figure 5:
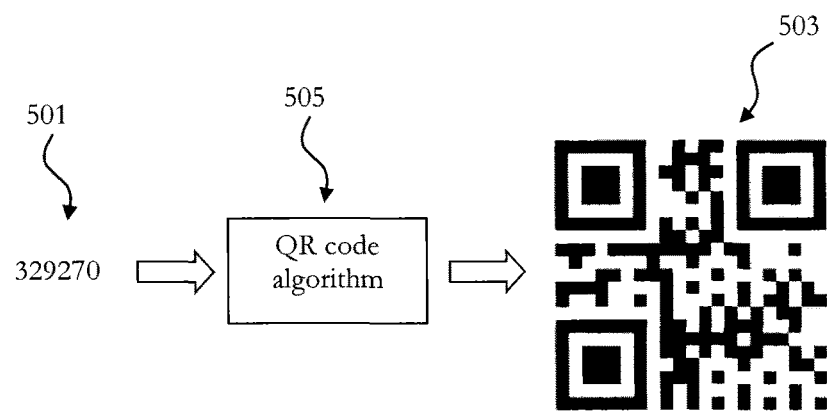
FIG. 5 schematically illustrates an example of a QR code which is generated from an auxiliary key.

FIG. 5 schematically illustrates an example of a QR code which is generated from an auxiliary key. A QR code 503 is generated from an auxiliary key 501 according to an QR code algorithm 505. The QR code 503 provides a graphical representation of auxiliary key 501.

Figure 6:
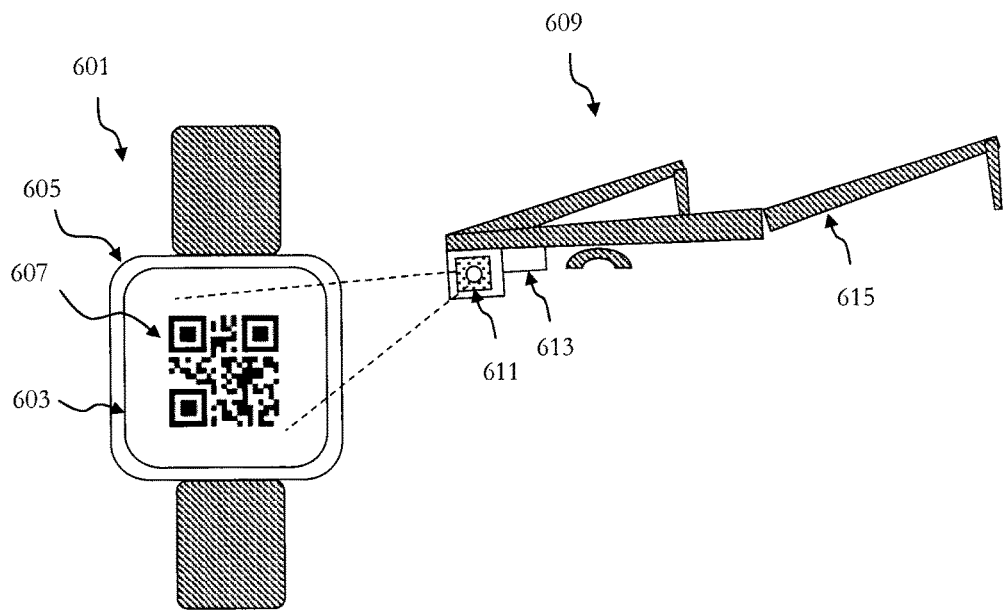
FIG. 6 schematically illustrates an embodiment of the capturing of a representation of an auxiliary key with an electronic device.

FIG. 6 schematically illustrates an embodiment of the capturing of a representation of an auxiliary key with an electronic device.

A wearable electronic device, here a smart watch 601, is equipped with a display 603. In the body 605 of smart watch 601 it is integrated a processor and, optionally, a wireless transceiver. The processor is configured to generate an auxiliary key and to display a representation 607 of the generated auxiliary key on the display 603.

Another wearable electronic device, here an optical head-mounted display 609 in the form of wearable glasses, is equipped with a camera 611, and a display unit 613. In a body 615 of the optical head-mounted display 609 it is integrated a processor and a wireless transceiver. The processor and the wireless transceiver are configured to access services of a computer or network via a communication link and to display such services to the user of the optical head-mounted display 609 by means of display unit 613. The processor is further configured to capture, by means of camera 611, a representation 607 of an auxiliary key displayed on display 603 of smart watch 601. The processor is further configured to restore an auxiliary key from the captured representation 607 of an auxiliary key and to use the restored auxiliary key for authenticating the user, for example as a second factor authentication password when authenticating the user at a web service.

The processor of the head-mounted display 609 may be configured to automatically recognize bar codes, matrix codes or character dances within the field of view of camera 611. Thus, just by watching the display of the smart watch 601, the optical head-mounted display 609 can pick up an auxiliary key and use this auxiliary key in authentication processes.

In embodiments where the auxiliary key is generated according to the HMAC-based one-time password algorithm which uses a synchronized counter value to generate an auxiliary key, the wireless transceiver can be used to exchange counter values in order to achieve synchronization. In other embodiments where the auxiliary key is generated according to the time-based one-time password algorithm a communication interface such as a wireless transceiver is not necessary. This is because according to the time-based one-time password algorithm the counter value is derived from the system time, so that synchronization of the counter values of the authentication partners is intrinsically present as long as the system clocks do not deviate too much from each other.

Figure 7:
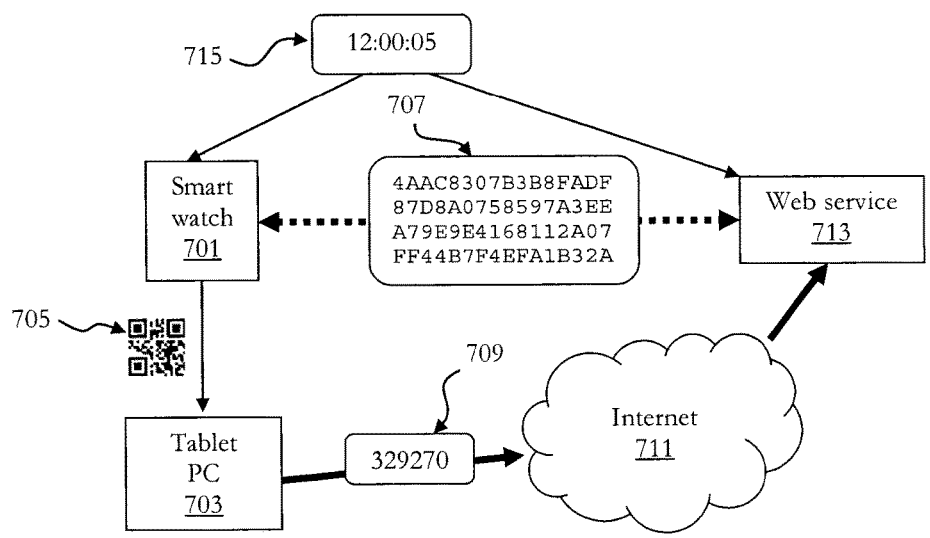
FIG. 7 schematically illustrates an embodiment of a system comprising a first electronic device, a second electronic device, and a web service.

FIG. 7 schematically illustrates an embodiment of a system comprising a first electronic device, a second electronic device, and a web service. In the embodiment of FIG. 7 the first electronic device is a smart watch 701 and the second electronic device is a tablet PC 703 which is equipped with a camera. A user intends to access a web service 713 by means of tablet PC 703. As indicated by the dotted arrow, a secret key 707 has been previously shared between smart watch 701 and web service 713. To authenticate at the web service 713, the user triggers the generation of a one-time password on smart watch 701. Thereupon, the smart watch 701 generates, as a one-time password, an auxiliary key based on the shared secret key 707 and the current system time 715. The smart watch 701 further generates a representation 705 of the auxiliary key, here a QR code, and displays the representation 705 of the auxiliary key on its display. The tablet PC captures the representation 705 of the auxiliary key and restores the auxiliary key 709 from the representation. In order to authenticate the user at the web service 713, the tablet PC 709 communicates the auxiliary key 709 to the web service 713 via the Internet 711. The web service 713 receives the auxiliary key 709 and validates the auxiliary key 709 based on the shared secret key 707 and the current system time 715. If the web service can correctly validate the auxiliary key 709, then the web service 713 grants the tablet PC, respectively the user access to its services.

In FIG. 7, the secret key 707 is shown as shared over a secure connection (dotted line) which is independent from the (less secure) Internet 711, thus resulting a very secure authentication process. In an alternative embodiment, however, the secret key 707 may likewise be shared directly over the Internet 711.

Figure 8:
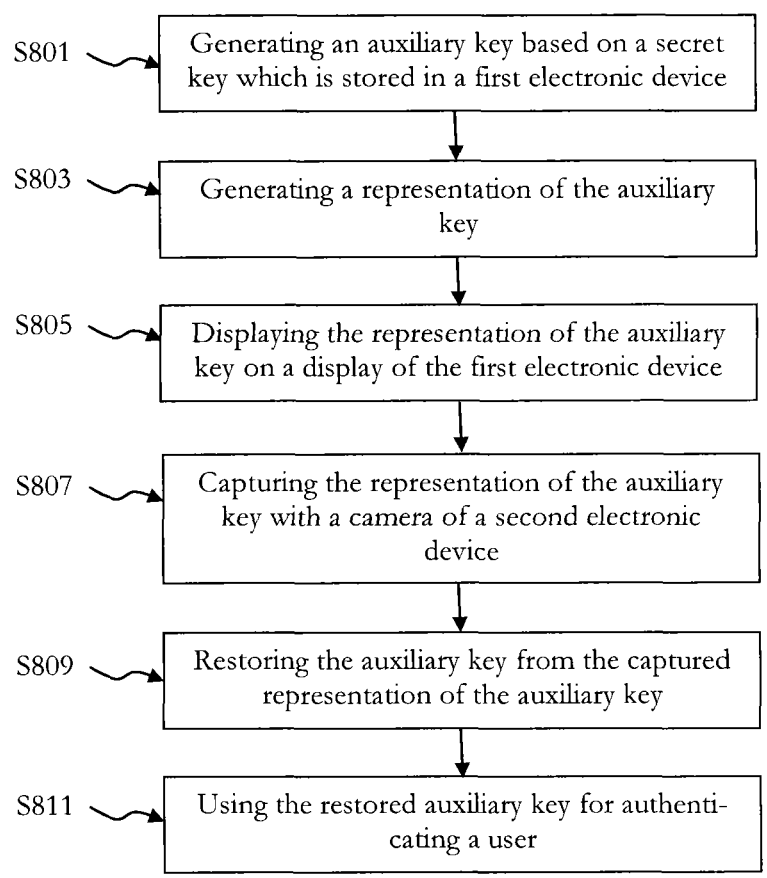
FIG. 8 schematically illustrates an embodiment of a method for authenticating an entity.

FIG. 8 schematically illustrates an embodiment of a method for authenticating an entity. At S801, an auxiliary key is generated based on a secret key which is stored in a first electronic device. At S803, a representation of the auxiliary key is generated. At S805, the representation of the auxiliary key is displayed on a display of the first electronic device. At S807, the representation of the auxiliary is captured with a camera of a second electronic device. At S809, the auxiliary key is restored from the captured representation of the auxiliary key. Finally, at S811, the restored auxiliary key is used for authenticating a user.

The methods described above can be implemented as a computer program causing a computer and/or a processor to perform the methods, when being carried out on the computer and/or processor.

In some embodiments, also a non-transitory computer-readable recording medium is provided that stores therein a computer program product, which, when executed by a processor, such as the processor described above, causes the method described to be performed.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) A method comprising
  generating an auxiliary key based on at least a secret key which is stored in a first electronic device,
  generating a representation of the auxiliary key,
  displaying the representation of the auxiliary key on a display of the first electronic device,
  capturing the representation of the auxiliary key with a camera of a second electronic device, and
  restoring the auxiliary key from the captured representation of the auxiliary key.
(2) The method of (1), in which the auxiliary key is a one-time password.
(3) The method of anyone of (1) or (2), in which the auxiliary key is generated based on the secret key and a counter value according to a HMAC-based one-time password algorithm.
(4) The method of anyone of (1) or (3), in which generating the representation of the auxiliary key comprises coding the auxiliary key according to a coding scheme.
(5) The method of claim (4), in which coding the auxiliary key comprises generating at least one of a bar code, a matrix code, an image code, or a pictorial animation.
(6) The method of anyone of (1) to (3), in which generating the representation of the auxiliary key comprises transferring the auxiliary key into an invisible watermark.
(7) The method of (6), in which displaying the representation of the auxiliary key on a display of the first electronic device comprises continuously inserting the invisible watermark into content displayed on the display of the first electronic device.
(8) The method of anyone of (1) to (7), in which restoring the auxiliary key from the captured representation of the auxiliary key comprises applying a statistical watermark detection technique.
(9) The method of anyone of (1) to (8), in which the restored auxiliary key is used as a second factor authentication password.
(10) The method of anyone of (1) to (9), in which the restored auxiliary key is used to authenticate a user at the second electronic device, or at a web site or web service which is accessible via the second electronic device.
(11) An electronic device, comprising
  a processor which is configured to derive an auxiliary key from at least a secret key stored in the electronic device, and to generate a representation of the auxiliary key, the representation of the auxiliary key being configured to be captured by a camera and decoded by a processor, and
  a display configured to display the representation of the auxiliary key.
(12) The electronic device of (11), in which the representation of the auxiliary key is at least one of a text code, a bar code, a matrix code, or an image code.
(13) The electronic device of (11), in which the representation of the auxiliary key is at least one of a pictorial animation, and an invisible watermark.
(14) The electronic device of anyone of (11) to (13), further comprising an input unit which enables a user of the electronic device to trigger the generating of the auxiliary key.
(15) The electronic device of anyone of claims (11) to (14), the electronic device being a wearable electronic device.
(16) The electronic device of (11) to (15), the electronic device being a smart watch.
(17) An electronic device comprising
  a camera configured to capture a representation of an auxiliary key, the auxiliary key having been generated based on a secret key,
  a processor configured to restore the auxiliary key from the captured representation of the auxiliary key and to use the restored auxiliary key for authenticating a user.
(18) The electronic device of (17), in which the restored auxiliary key is used as a second factor authentication password.
(19) The electronic device of anyone of (17) or (18), in which the restored auxiliary key is used to authenticate a user at a web site or web service.
(20) The electronic device of anyone of (17) to (19), the electronic device being an optical head-mounted display.
  (21) A system comprising an electronic device for generating an auxiliary key as defined in anyone of (11) to (16) and an electronic device for capturing and restoring the auxiliary key as defined in anyone of (17) to (19).

(22) The system of (21), further comprising a web service, the auxiliary key being used to authenticate at the web service.

The invention claimed is:

1. A method comprising:
generating a one-time password according to a one-time password algorithm using at least a secret key stored in a first electronic device and an integer value that represents a number of time steps, which each have a predetermined duration, from a predefined initial time to a current system time of the first electronic device;
generating a representation of the one-time password by coding the one-time password according to a coding scheme to generate a pictorial animation;
displaying the pictorial animation on a display of the first electronic device;
capturing the pictorial animation with a camera of a second electronic device;
restoring the one-time password from the pictorial animation; and
authenticating a user at the second electronic device, or at a web site or web service which is accessible via the second electronic device, using the restored one-time password.

2. The method of claim 1, in which the one-time password is generated according to a hash-based message authentication code (HMAC)-based one-time password algorithm using the secret key and a counter value generated based on the current system time.

3. The method of claim 1, in which the restored one-time password is used as a second factor authentication password.

4. A system, comprising
a first electronic device including:
a processor configured to
generate a one-time password according to a one-time password algorithm using at least a secret key stored in the first electronic device and an integer value that represents a number of time steps, which each have a predetermined duration, from a predefined initial time to a current system time of the first electronic device,
generate a representation of the one-time password by coding the one-time password according to a coding scheme to generate a pictorial animation, and
a display configured-to display the pictorial animation; and
a second electronic device including:
a camera configured to capture the pictorial animation representation of the one-time password generated by the first electronic device, and
a processor configured to:
restore the one-time password from the pictorial animation, and
authenticate a user at the electronic device, or at a web site or web service which is accessible via the electronic device, using the restored one-time password.

5. The system of claim 4, wherein the first electronic device further includes:
a user interface which enables a user of the electronic device to trigger the generating of the one-time password.

6. The system claim 4, wherein the first electronic device is a wearable electronic device.

7. The system claim 4, wherein the first electronic device is a smart watch.

8. The system according to claim 4, wherein the processor of the first electronic device is configured to:
acquire the current system time of the first electronic device; and
generate a counter value based on the current system time of the first electronic device.

9. The system according to claim 8, wherein the processor of the first electronic device is configured to generate the one-time password according to a hash-based message authentication code (HMAC)-based one-time password algorithm using at least the secret key and the counter value generated based on the current system time of the first electronic device.

10. The system of claim 4, wherein
the pictorial animation is a dancing character, and
the processor of the first electronic device is configured to code the one-time password by transferring digits of the auxiliary key to movements of the dancing character.

11. The system of claim 10, wherein
the coding scheme is defined by defining each dance move of the dancing character as a numeric code.

12. An electronic device comprising:
a camera configured to capture a pictorial animation representation of a one-time password generated by another electronic device that codes the one-time password according to a coding scheme to generate the pictorial animation, the one-time password having been generated at the another electronic device according to a one-time password algorithm using a secret key and an integer value that represents a number of time steps, which each have a predetermined duration, from a predefined initial time to a current system time of the another electronic device; and
a processor configured to
restore the one-time password from the pictorial animation, and
authenticate a user at the electronic device, or at a web site or web service which is accessible via the electronic device, using the restored one-time password.

13. The electronic device of claim 12, in which the restored one-time password is used as a second factor authentication password.

14. The electronic device of claim 12, in which the restored one-time password is used to authenticate a user at a web site or web service.

15. The electronic device of claim 12, the electronic device being an optical head-mounted display.

* * * * *